United States Patent
Furusawa et al.

(10) Patent No.: US 10,705,411 B2
(45) Date of Patent: Jul. 7, 2020

(54) DOCUMENT CAMERA

(71) Applicant: Elmo Co., Ltd., Nagoya-shi, Aichi (JP)

(72) Inventors: Hiroyuki Furusawa, Nagoya (JP); Yusuke Dohi, Nagoya (JP)

(73) Assignee: Elmo Co., Ltd., Nagoya-shi, Aichi (JP)

( * ) Notice: Subject to any disclaimer, the term of this patent is extended or adjusted under 35 U.S.C. 154(b) by 0 days.

(21) Appl. No.: 16/408,844

(22) Filed: May 10, 2019

(65) Prior Publication Data

US 2020/0159089 A1  May 21, 2020

(30) Foreign Application Priority Data

Nov. 19, 2018 (JP) ................................. 2018-216100

(51) Int. Cl.
  *G03B 17/04* (2006.01)
  *H04N 1/00* (2006.01)
  *G03B 17/56* (2006.01)

(52) U.S. Cl.
  CPC ........... *G03B 17/04* (2013.01); *G03B 17/561* (2013.01); *H04N 1/00129* (2013.01)

(58) Field of Classification Search
  CPC ............................................. H04N 2201/0436
  See application file for complete search history.

(56) References Cited

U.S. PATENT DOCUMENTS

| | | | | |
|---|---|---|---|---|
| 7,980,708 B2 * | 7/2011 | Ishikawa | ............ | H04N 1/00129 345/173 |
| 8,340,477 B2 * | 12/2012 | Foss | ................... | H04N 1/00381 358/449 |
| 2017/0176843 A1 * | 6/2017 | Yamakose | ............ | G03B 17/561 |

FOREIGN PATENT DOCUMENTS

| | | |
|---|---|---|
| CN | 202218305 U | 5/2012 |
| JP | 2006345203 A | 12/2006 |
| JP | 2013009304 A | 1/2013 |
| JP | 2016-219931 A | 12/2016 |
| JP | 2017118225 A | 6/2017 |

OTHER PUBLICATIONS

"Meet the Hovercam Ultra 8 Document Camera", https://www.youtube.com/watch?v=20VdtFU16w8 published May 19, 2015, Still captures of relevant portions attached (Year: 2015).*
Office Action of JP corresponding application No. 2018-216111 dated Feb. 25, 2020 and English translation thereof.

* cited by examiner

*Primary Examiner* — Clayton E. LaBalle
*Assistant Examiner* — Leon W Rhodes, Jr.
(74) *Attorney, Agent, or Firm* — Muncy, Geissler, Olds & Lowe, P.C.

(57) ABSTRACT

A document camera includes a base, a monitor display mounted on the base, a first arm, a second arm, and a camera head. The first arm is mounted to the base so as to be pivotable in a right-left direction. The second arm is mounted to the first arm so as to be pivotable in the right-left direction. The camera head is mounted to the second arm so as to be pivotable in the right-left direction. The arms and the camera head are laid into respective laid positions when the document camera is not in use. The arms and the camera head are raised into respective standing positions when the document camera is in use. When laid into the respective laid positions, the arms and the camera head are fit within an upper surface of the base, and the monitor display is substantially covered by the first arm.

6 Claims, 10 Drawing Sheets

DOCUMENT CAMERA

CROSS-REFERENCE TO RELATED APPLICATIONS

This application is based upon and claims the benefit of priority from the prior Japanese Patent Application No. 2018-216100 filed on Nov. 19, 2018, the entire contents of which are incorporated herein by reference.

BACKGROUND

1. Technical Field

The present disclosure relates to a document camera, and more particularly to a document camera which includes a base provided with an operating portion on which are provided various operating switches such as a power switch, a zoom switch for adjusting a focal length of an imaging lens and an autofocus switch autofocusing the imaging lens, an arm pivotally assembled to the base and a camera head mounted on a distal end of the arm, and in which a material such as document, model or the like is imaged by the camera head and an obtained image is reproduced by a monitor television, a video projector or a smartphone.

2. Related Art

As one type of the above-mentioned document camera, Japanese Patent Application Publication No. 2016-219931 discloses a document camera in which a monitor display is mounted on an upper surface of the base provide with an operating portion so that an obtained image can be checked on the monitor display. This document camera includes a first arm assembled to the base to be pivotable in a right/left direction between an overlapping position where the first arm overlaps a side surface of the base and a standing position where the first arm stands on the side surface of the base, and a second arm assembled to a distal end of the first arm so that the second arm is pivotable between an overlapping position where the second arm overlaps the first arm. The document camera further includes a camera head assembled to a distal end of the second arm so that the camera head is pivotable about a shaft perpendicular to the second arm.

When the document camera is not in use, the first arm can be laid along a side of the base and the second arm can be laid on the first arm. Furthermore, since the camera head can be laid on a front end of the base, the document camera can be folded in a compact state and is accordingly convenient for safekeeping and carry.

However, the monitor display is exposed on an upper surface of the base when the above-described conventional document camera is kept in a safe place or carried in a folded state. Accordingly, the monitor display is easy to damage. Furthermore, since the monitor display is substantially coplanar with the upper surface of the base, an image on the monitor display is difficult to view laterally although visible from above. Still furthermore, the document camera is folded so that the first and second arms and the camera head are laid on the side and the upper surface of the base, with the result that horizontal and vertical dimensions of the document camera are increased.

SUMMARY

Therefore, an object of the disclosure is to provide a document camera which can prevent the monitor display provided on the upper surface of the base from being damaged when kept in safe or carried with the arms and the camera head being folded, and which is foldable in a compact form.

Another object of the disclosure is to provide a document camera which is provided with a monitor display easily viewable from above or laterally.

Still further another object of the disclosure is to provide a document camera which is excellent in operability.

The present disclosure provides a document camera including a base, a monitor display provided on an upper surface of the base, a first arm mounted via a first shaft to a right or left end of the base so as to be pivotable in a right-left direction between a laid position where the first arm is laid on the upper surface of the base and a standing position where the first arm is raised from the right or left end of the base to stand, a second arm mounted via a second shaft to a distal end of the first arm so as to be pivotable in the right-left direction between a laid position where the second arm is laid on the first arm and a standing position where the second arm is raised from the first arm to stand, and a camera head mounted via a third shaft to a distal end of the second arm so as to be pivotable in the right-left direction between a laid position where the camera head is laid on the second arm and a standing position where the camera head is raised from the second arm to stand. In the document camera, the first and second arms and the camera head are laid into the respective laid positions thereby to be folded when the document camera is not in use. The first and second arms and the camera head are raised into the respective standing positions when the document camera is in use.

When the first and second arms and the camera head are laid into the respective laid positions thereby to be folded, the first and second arms and the camera head are fit within the upper surface of the base, and the monitor display is substantially covered by the first arm.

According to the above-described document camera, when folded, the first and second arms and the camera head are fit within an outer peripheral edge of the base, with the result that the document camera can be folded in a compact manner. Furthermore, since the monitor display is substantially covered by the first arm when the first and second arms and the camera head are folded, the first arm functions as a cover for the monitor display. Consequently, the first arm can prevent the monitor display from being damaged when the document camera is safekept or carried.

The first arm may be formed with a second arm housing recess in which the second arm is housed in a laid state. The second arm may be formed with a camera head housing recess in which the camera head is housed in a laid state. Upper surfaces of the first and second arms and the camera head may substantially be coplanar when the second arm is housed in the second arm housing recess and the camera head is housed in the camera head housing recess. In this configuration, the upper surfaces of the first and second arms and the camera head are substantially coplanar when the first and second arms and the camera head are folded. Consequently, the document camera can be folded in a further compact manner.

The base may be formed with a monitor display housing recess for housing the monitor display. The monitor display may be mounted to the base so as to be pivotable in a front-back direction between a laid position where the monitor display is laid in the monitor display housing recess and a standing position where the monitor display is raised from the monitor display housing recess to stand. An upper surface of the monitor display and the upper surface of the base may substantially be coplanar when the monitor display is laid into the monitor display housing recess. In this configuration, the monitor display can be raised from a position where the monitor display substantially coplanar with the base is raised thereby to stand on the base, the monitor display can be set to be easily visible also from the side.

The camera head and the first and second arms may be spread when the camera head is lifted in a case where the first and second arms and the camera head all of which are located at the respective laid positions are moved to the respective standing positions. In this configuration, the first and second arms and the camera head are spread when the camera head is raised. Consequently, the document camera can be set to the use state easily and quickly and is accordingly convenient.

The document camera may further include a third arm mounted via the third shaft to the second arm so as to be pivotable in the right-left direction. In this case, the camera head may be mounted via a fourth shaft to the third arm so as to be pivotable within a plane parallel to an installation surface of the base. In this configuration, the camera head can be pivoted within the plane parallel to the installation surface of the base. Consequently, the usability of the document camera can be improved when an object in a peripheral area around the base is imaged.

The first arm may be mounted via a sixth shaft to the base so as to be pivotable within the plane parallel to the base. This can widen an imaging area and further improve the usability of the document camera since the first arm can be pivoted within the plane parallel to the base.

The document camera may further include a fourth arm mounted via the fourth shaft to the third arm so as to be pivotable within the plane parallel to the base. In this case, the camera head may be mounted via a fifth shaft perpendicular to the fourth shaft to the fourth arm so as to be pivotable within a plane perpendicular to the installation surface of the base. In this configuration, the usability of the document camera can further be improved since the camera head can be pivoted within the plane perpendicular to the installation surface of the base.

DETAILED DESCRIPTION

Figure 1:
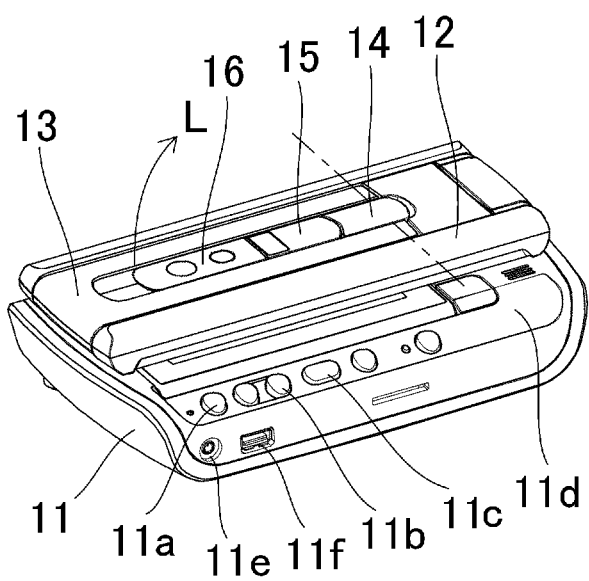
FIG. 1 is a perspective view of a document camera of an embodiment in a folded state.

An embodiment will be described with reference to the drawings. Referring to FIGS. 1 to 10, a document camera 10 of the embodiment is shown. The document camera 10 includes a base 11, a first arm 12, a second arm 13, a third arm 14, a fourth arm 15, and a camera head 16. The base 11 is formed into a flat box shape having a substantially rectangular planar shape and has an upper surface provided with a monitor display 17. The upper surface of the base 11 includes a front end formed with an operating portion 11d on which are provided various operating switches including a power switch 11a, a zoom switch 11b for adjusting a focal length of an imaging lens and an autofocus switch 11c for autofocusing the imaging lens. The base 11 has a front side on which are provided a power-supply terminal 11e and a connection terminal 11f for connection to a monitor television or the like.

The first arm 12 includes a pair of front and rear support pillars 12a, a bottom cover 12b and a base portion 12c connecting proximal ends of both support pillars 12. Both support pillars 12a, the bottom cover 12b and the base portion 12c define a second arm housing recess 12d (refer to FIG. 3). A first shaft with an axis A and a sixth shaft with an axis B are incorporated in the base portion 12c of the first arm 12. The first arm 12 is mounted to the base 11 so as to be pivotable in a right-left direction about the axis A and also mounted to the base 11 so as to be pivotable about the axis B within a plane parallel to the upper surface of the base 11 as shown by arrow G in FIG. 8. The first arm 12 is provided at a portion of the base 11 located near the right end and the rear end of the base 11.

The second arm 13 includes a pair of front and rear support pillars 13a and a base portion 13b connecting proximal ends of both support pillars 13a. The support pillars 13a and the base portion 13b define a camera head housing recess 13c for housing the third arm 14, the fourth arm 15 and the camera head 16. The base portion 13b incorporates a second shaft with an axis C. The base portion 13b is mounted to distal ends of the support pillars 12a of the first arm 12. The second arm 13 is mounted via a second shaft with a central axis C to a distal end of the first arm 12 so as to be pivotable in the right-left direction.

The third arm 14 incorporates a third shaft with a central axis D in a proximal end 14a thereof. The third arm 14 is mounted via the third shaft to a distal end of the second arm 13 so as to be pivotable in the right-left direction. The fourth arm 15 incorporates a fourth shaft with a central axis E in a proximal end 15a thereof. The fourth arm 15 is mounted via the fourth shaft to a distal end of the third arm 14 so as to be pivotable in a front-back direction within a plane parallel to an installation surface of the base 11 as shown by arrow H in FIG. 8. The camera head 16 incorporates a fifth shaft with a central axis F in a proximal end 16a thereof. The camera head 16 is mounted via the fifth shaft to a distal end of the fourth arm 14 so as to be pivotable within a plane perpendicular to the installation surface of the base 11 as shown by arrow J in FIG. 8.

The monitor display 17 incorporates a seventh shaft with a central axis K in a front end 17a thereof and is assembled via the seventh shaft to the base 11 so as to be pivotable in the front-rear direction. A monitor display housing recess 11g is defined in the base 11 to house the monitor display 17.

Figure 6:
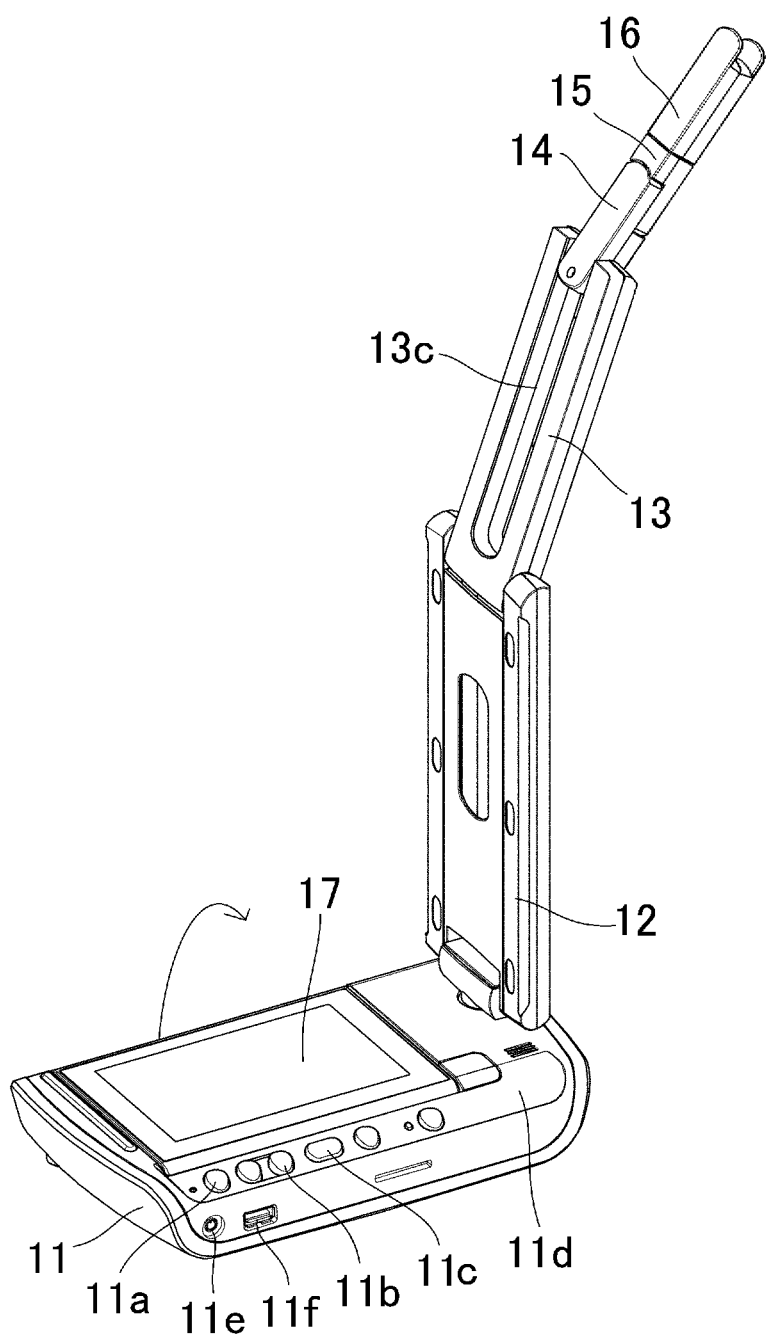
FIG. 6 is further another perspective view of the document camera in change from the folded state to the use state.
Figure 7:
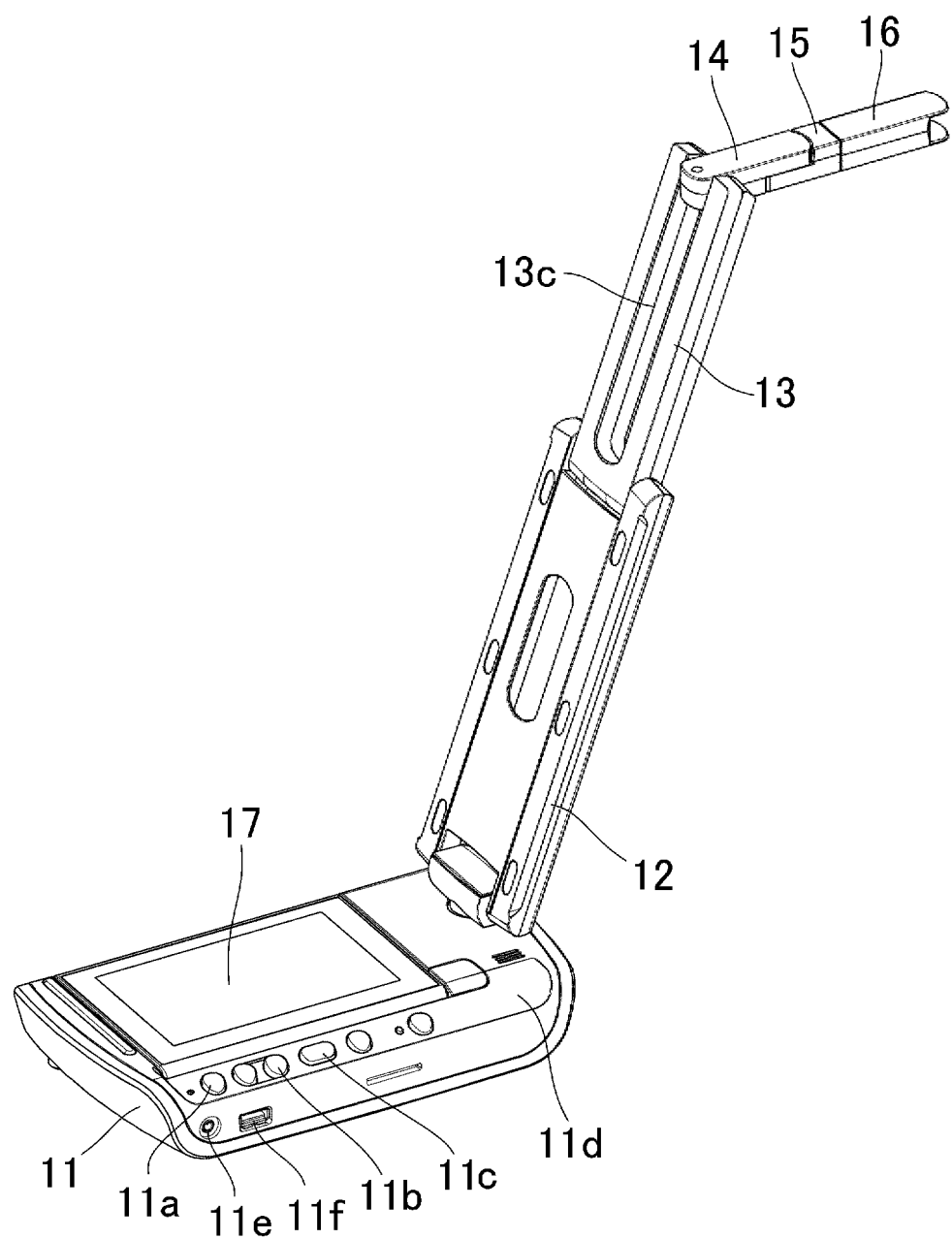
FIG. 7 is a perspective view of the document camera in the use state.
Figure 8:
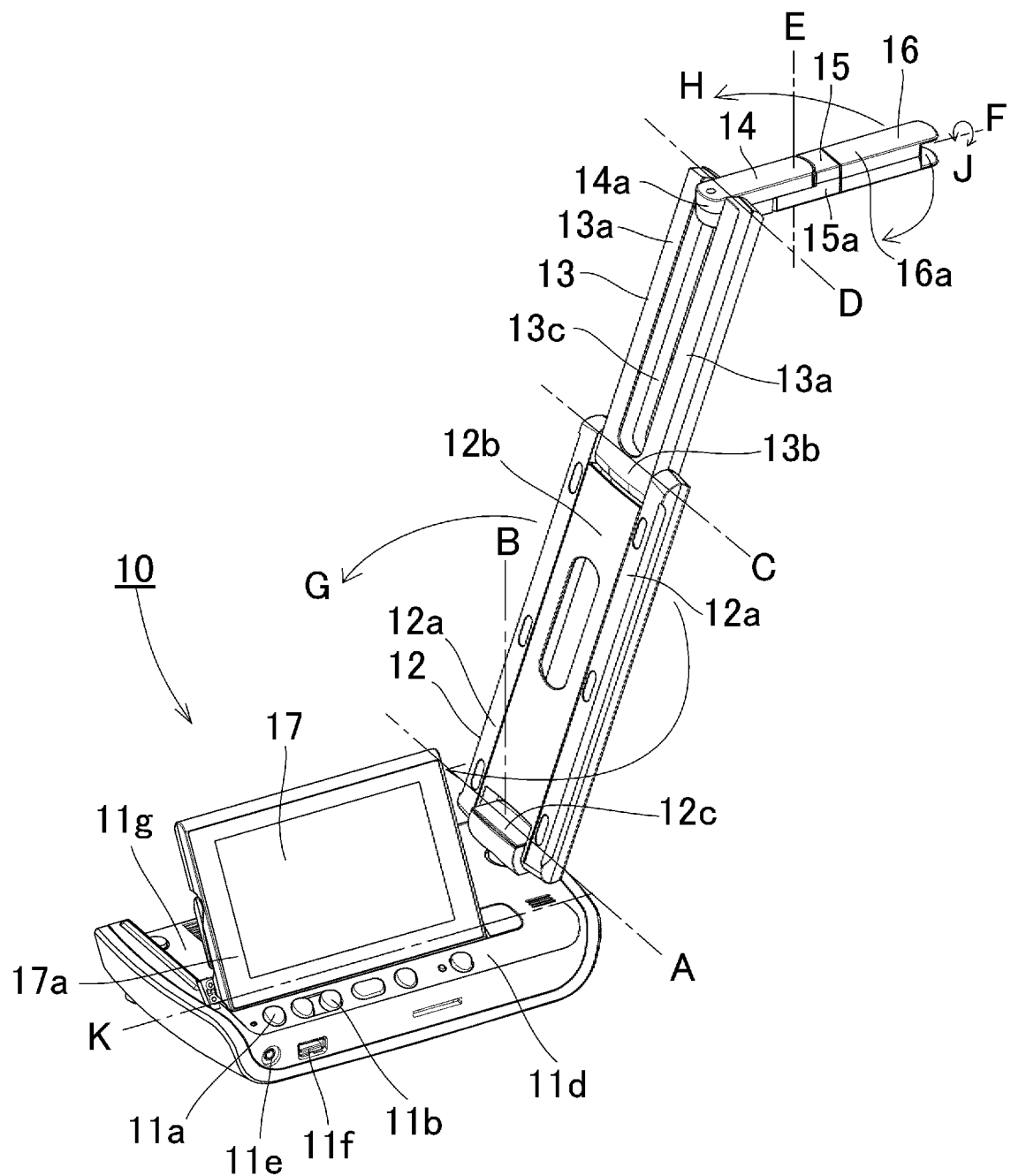
FIG. 8 is a perspective view of the document camera in another use state.
Figure 9:
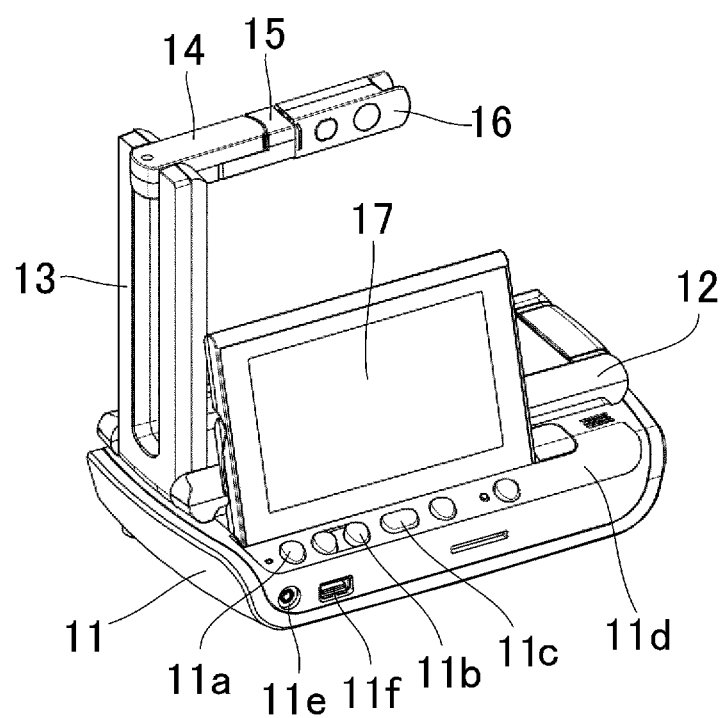
FIG. 9 is a perspective view of the document camera in still another use state.

The monitor display 17 is mounted to the base 11 to be pivotable between a laid position where the monitor display 17 is laid in the monitor display housing recess 11g of the base 11 as illustrated in FIGS. 1 to 7 and a raised position where the monitor display 17 is raised from the monitor display housing recess 11g to stand from the front end of the base 11 as illustrated in FIGS. 8 and 9. The monitor display 17 has a configuration and dimensions predetermined so as to be substantially coplanar with the upper surface of the base 11 when laid in the monitor display housing recess 11g.

Figure 2:
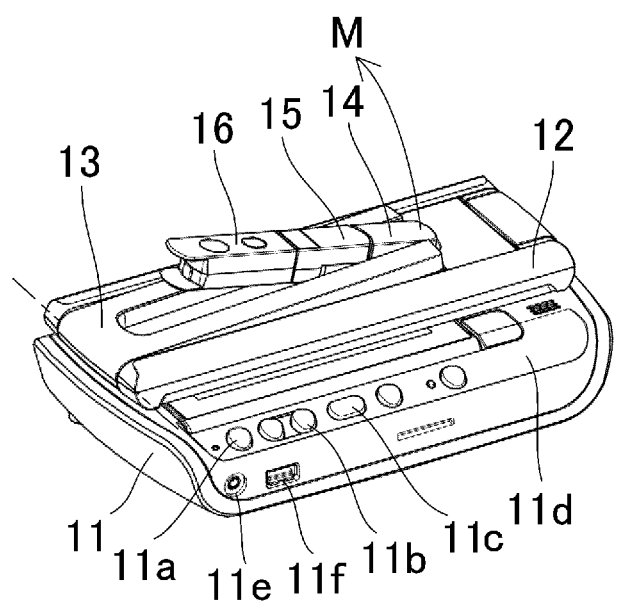
FIG. 2 is a perspective view of the document camera in change from a folded state to a use state.
Figure 3:
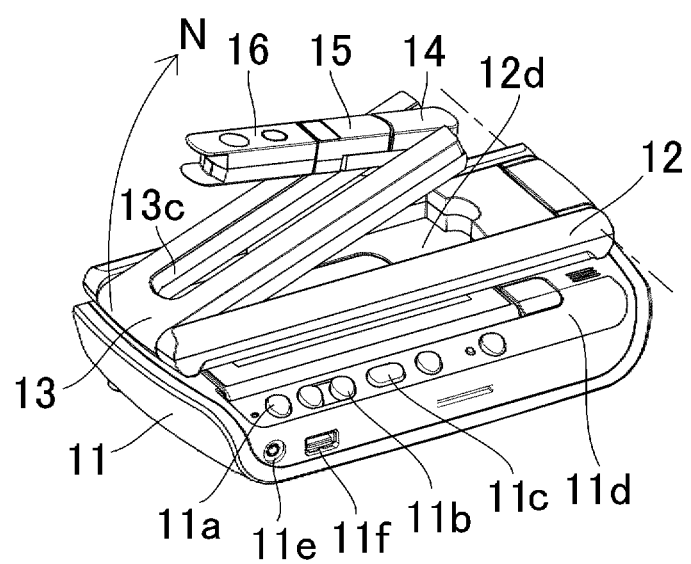
FIG. 3 is another perspective view of the document camera in change from the folded state to the use state.

The first arm 12 is mounted to the base 11 so as to be pivotable between a laid position where the first arm 12 is laid on the upper surface of the base 11 as illustrated in FIGS. 1 to 3 and a raised position where the first arm 12 stands from the front end of the base 11 to be tilted forward as illustrated in FIGS. 7 and 8.

The second arm 13 is mounted to the first arm so as to be pivotable between a laid position where the second arm 13 is laid in the second arm housing recess 12d of the second arm 12 as illustrated in FIG. 1 and a raised position where the second arm 13 is raised from the second arm housing recess 12d as illustrated in FIGS. 2 to 7 and extends from the distal end of the first arm 12 in parallel to the first arm 12 as illustrated in FIG. 7.

The third arm 14, the fourth arm 15 and the camera head 16 are mounted to the distal end of the second arm 13 so as to be pivotable between a laid position where the third arm 14, the fourth arm 15 and the camera head 16 are laid in the camera head housing recess 13c as illustrated in FIG. 1 and a folded position where the third arm 14, the fourth arm 15 and the camera head 16 are raised from the camera head housing recess 13c as illustrated in FIGS. 2 to 7 and extend from the distal end of the second arm 13 substantially in parallel to the installation surface of the base 11 as illustrated in FIG. 7.

The structure of the document camera 10 according to the embodiment is as described above. How to use the document camera 10 will now be described. When the document camera 10 is not in use, the monitor display 17, the first and second arms 12 and 13, and the third and fourth arms 14 and 15 and the camera head 16 are set to the respective laid positions as illustrated in FIG. 1, so that the document camera 10 is safekept or carried in a folded state. In the folded state, upper surfaces of the first to fourth arms 12 to 15 and the camera head 16 are substantially coplanar.

Figure 4:
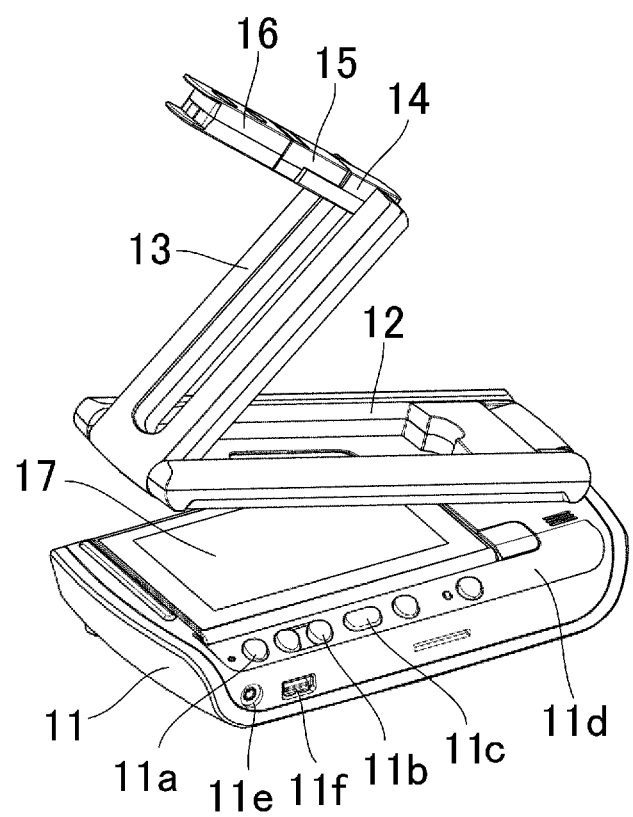
FIG. 4 is still another perspective vie of the document camera in change from the folded state to the use state.
Figure 5:
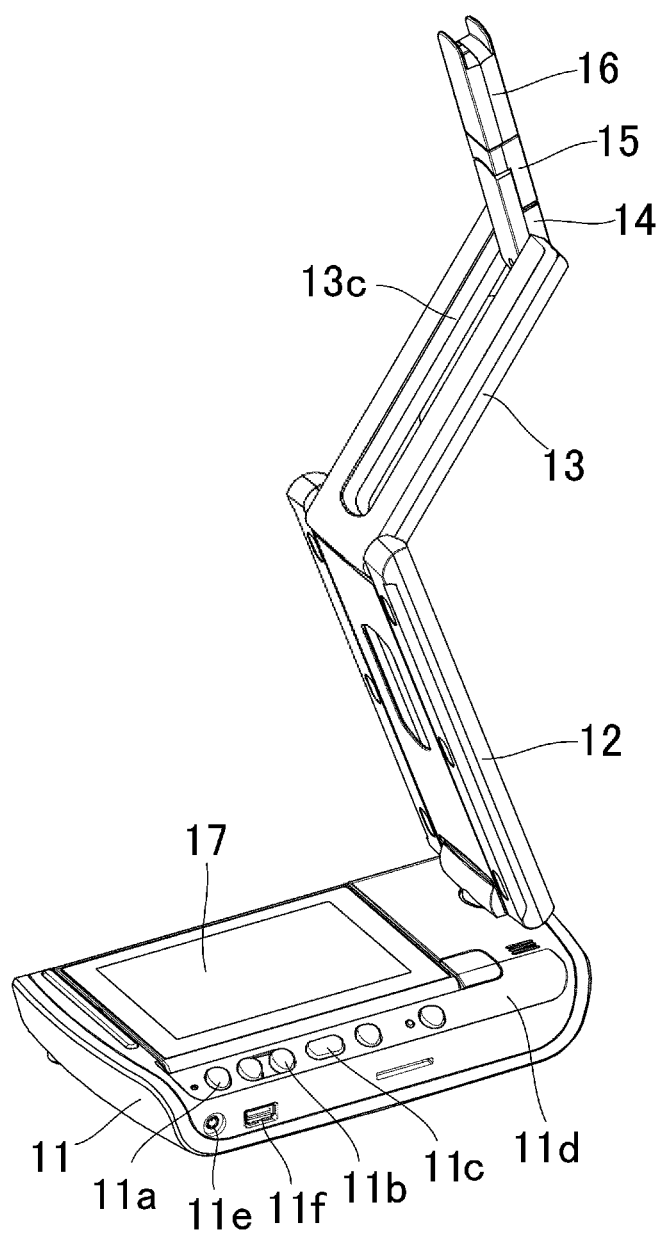
FIG. 5 is further another perspective view of the document camera in change from the folded state to the use state.

In order that a document may be imaged by the document camera 10, the user puts his/her finger on the camera head 16 to lift the camera head 16 in the direction of arrow L as illustrated in FIG. 1. With this, the camera head 16 is raised from the camera head housing recess 13c as shown by arrow M in FIG. 2. When the camera head 16 is further lifted, the second arm 13 is raised from the second arm housing recess 12d as shown by arrow N in FIG. 3 and the first arm 12 is subsequently raised from the monitor display 17 as illustrated in FIG. 4. Thus, when the camera head 16 is lifted, the camera head 16, the third and fourth arms 14 and 15, and the first and second arms 12 and 13 are spread into a Z-shape. Subsequently, the camera head 16, the third and fourth arms 14 and 15, and the first and second arms 12 and 13 are pivoted as illustrated in FIGS. 5 to 7, and the monitor display 17 is lifted from the monitor display housing recess 11g when necessary, as illustrated in FIG. 8. The user then images the document by the camera head 16 while checking an image on the monitor display 17.

Furthermore, since the first arm 12 is provided at the portion of the base 11 located near the right end and the rear end of the base 11, the first arm may be laid on the base 11 through a space behind the raised monitor display 17 and the second arm 13 and the camera head 16 may be raised, so that a peripheral area around the base 11 can be imaged, as illustrated in FIG. 9.

Figure 10:
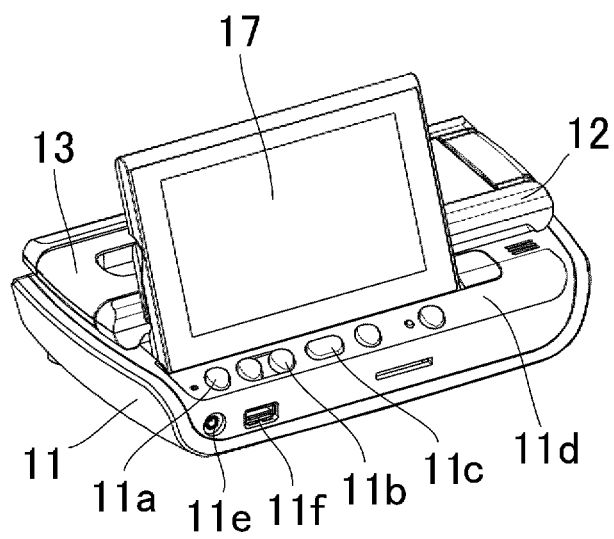
FIG. 10 is a perspective view of the document camera in still further another use state.

Furthermore, when an image is to be checked after having been taken, the first arm can be laid on the upper surface of the base 11 together with the folded camera head 16, the third and fourth arms 14 and 15, and the second arm 13 so as to extend through the space behind the monitor display 17, as illustrated in FIG. 10.

According to the document camera 10 of the embodiment, the configurations and the dimensions of the first and second arms 12 and 13 and the camera head 16 are predetermined so as to be fit within the upper surface of the base when folded, as illustrated in FIG. 1. Consequently, the document camera 10 can be folded in a compact manner. Furthermore, the monitor display 17 is substantially covered by the first arm 12 when the first and second arms 12 and 13 and the camera head 16 are folded. Accordingly, the first arm 12 functions as a cover for the monitor display 17. Consequently, the monitor display 17 can be prevented from being damaged when the document camera is safekept or carried.

The upper surfaces of the first and second arms 12 and 13 and the camera head 16 are substantially coplanar when the first and second arms 12 and 13 and the camera head 16 are folded. Consequently, the document camera 10 can be folded in a further compact manner.

The monitor display 17 is raised from the position where the monitor display 17 is coplanar with the base 11, with the result that the monitor display 17 can be caused to stand on the base 11. Consequently, the monitor display 17 can be set so as to be easily viewed from the side.

The camera head 16 and the first and second arms 12 and 13 are spread into the Z-shape when the camera head 16 is lifted. Consequently, the document camera 10 can easily and quickly be set into a usage state, offering convenience.

The camera head 16 can be pivoted within a plane parallel to the installation surface of the base 11 as shown by arrow H in FIG. 8. Consequently, the document camera 10 is convenient when the peripheral area around the base 11 is imaged.

The first arm 12 can be pivoted within the plane parallel to the base 11 as shown by arrow G in FIG. 8, with the result of an increase in an imaging range. This can further improve the usability of the document camera 10.

The camera head 16 can be pivoted within the plane perpendicular to the installation surface of the base 11 as shown by arrow F in FIG. 8. This can further improve the usability of the document camera 10.

The foregoing description and drawings are merely illustrative of the present disclosure and are not to be construed in a limiting sense. Various changes and modifications will become apparent to those of ordinary skill in the art. All such changes and modifications are seen to fall within the scope of the appended claims.

What is claimed is:

1. A document camera comprising:
   a base;
   a monitor display provided on an upper surface of the base;
   a first arm mounted via a first shaft to a right or left end of the base so as to be pivotable in a right-left direction between a laid position where the first arm is laid on the upper surface of the base and a standing position where the first arm is raised from the right or left end of the base to stand;
   a second arm mounted via a second shaft to a distal end of the first arm so as to be pivotable in the right-left direction between a laid position where the second arm is laid on the first arm and a standing position where the second arm is raised from the first arm to stand; and
   a camera head mounted via a third shaft to a distal end of the second arm so as to be pivotable in the right-left direction between a laid position where the camera head is laid on the second arm and a standing position where the camera head is raised from the second arm to stand, wherein the first and second arms and the camera head are laid into the respective laid positions thereby to be folded when the document camera is not in use;

the first and second arms and the camera head are raised into the respective standing positions when the document camera is in use;

when the first and second arms and the camera head are laid into the respective laid positions thereby to be folded, the first and second arms and the camera head are fit within the upper surface of the base, and the monitor display is substantially covered by the first arm, the base is formed with a monitor display housing recess for housing the monitor display;

the monitor display is mounted to the base so as to be pivotable in a front-back direction between a laid position where the monitor display is laid in the monitor displa housing recess and a standing position where the monitor display is raised from the monitor display housing recess to stand; and an upper surface of the monitor display and the upper surface of the base are substantially coplanar when the monitor display is laid into the monitor display housing recess.

2. The document camera according to claim 1, wherein:

the first arm is formed with a second arm housing recess in which the second arm is housed in a laid state;

the second arm is formed with a camera head housing recess in which the camera head is housed in a laid state; and upper surfaces of the first and second arms and the camera head are substantially coplanar when the second arm is housed in the second arm housing recess and the camera head is housed in the camera head housing recess.

3. The document camera according to claim 1, wherein the camera head and the first and second arms are spread when the camera head is lifted in a case where the first and second arms and the camera head all of which are located at the respective laid positions are moved to the respective standing positions.

4. The document camera according to claim 1, further comprising a third arm mounted via the third shaft to the second arm so as to be pivotable in the right-left direction, wherein the camera head is mounted via a fourth shaft to the third arm so as to be pivotable within a plane parallel to an installation surface of the base.

5. The document camera according to claim 1, wherein the first arm is mounted via a sixth shaft to the base so as to be pivotable within the plane parallel to the base.

6. The document camera according to claim 4, further comprising a fourth arm mounted via the fourth shaft to the third arm so as to be pivotable within the plane parallel to the base, wherein the camera head is mounted via a fifth shaft perpendicular to the fourth shaft to the fourth arm so as to be pivotable within a plane perpendicular to the installation surface of the base.

* * * * *